(12) United States Patent
McDavid, Jr.

(10) Patent No.: US 7,211,905 B1
(45) Date of Patent: May 1, 2007

(54) VEHICLE-MOUNTED GENERATOR

(76) Inventor: William K. McDavid, Jr., P.O. Box 319, Tetonia, ID (US) 83001-0319

( * ) Notice: Subject to any disclaimer, the term of this patent is extended or adjusted under 35 U.S.C. 154(b) by 53 days.

(21) Appl. No.: 11/274,616

(22) Filed: Nov. 15, 2005

(51) Int. Cl.
*B60K 11/00* (2006.01)

(52) U.S. Cl. .......................... 290/44; 290/55; 180/65.3

(58) Field of Classification Search ................. 290/43, 290/44, 54, 55; 180/165, 65.3, 65.2
See application file for complete search history.

(56) References Cited

U.S. PATENT DOCUMENTS

| | | | |
|---|---|---|---|
| 2,468,964 A | 5/1949 | Dunn et al. | |
| 3,248,967 A | 5/1966 | Lewis | |
| 3,556,239 A * | 1/1971 | Spahn ....................... | 180/65.2 |
| 3,876,925 A * | 4/1975 | Stoeckert ....................... | 322/1 |
| 3,942,909 A | 3/1976 | Yengst | |
| 3,970,409 A | 7/1976 | Luchuk | |
| 4,018,543 A | 4/1977 | Carson et al. | |
| 4,070,131 A | 1/1978 | Yen | |
| 4,084,918 A | 4/1978 | Pavlecka | |
| 4,141,425 A * | 2/1979 | Treat .......................... | 180/2.2 |
| 4,179,007 A * | 12/1979 | Howe .......................... | 180/2.2 |
| 4,191,505 A | 3/1980 | Kaufman | |
| 4,295,386 A | 10/1981 | Zhivotov | |
| 4,309,146 A | 1/1982 | Hein et al. | |
| 4,318,019 A | 3/1982 | Teasley et al. | |
| 4,335,627 A | 6/1982 | Maxwell | |
| 4,418,880 A | 12/1983 | de Waal | |
| 4,421,452 A | 12/1983 | Rougemont | |
| 4,452,562 A | 6/1984 | Hsu | |
| 4,457,666 A | 7/1984 | Selman, Jr. | |
| 4,499,034 A | 2/1985 | McAllister, Jr. | |
| 4,508,973 A | 4/1985 | Payne | |
| 4,551,631 A | 11/1985 | Trigilio | |
| 4,834,610 A | 5/1989 | Bond, III | |
| 4,963,761 A | 10/1990 | Wight | |
| 5,086,664 A | 2/1992 | Wagner | |
| 5,197,352 A | 3/1993 | Haikawa | |
| 5,300,817 A | 4/1994 | Baird | |
| 5,463,257 A | 10/1995 | Yea | |
| 5,478,197 A | 12/1995 | Schatz et al. | |
| 5,503,464 A | 4/1996 | Collura | |

(Continued)

FOREIGN PATENT DOCUMENTS

EP 0294049 A2 12/1988

(Continued)

*Primary Examiner*—Nicholas Ponomarenko
(74) *Attorney, Agent, or Firm*—Steven W. Smith

(57) ABSTRACT

A vehicle-mounted generator is powered by relative wind produced by the combination of ambient wind and motion of the vehicle, or by movement of water when mounted on the hull of a water-borne vehicle. A rigid cylindrical housing forms an enclosed interior chamber. Wind asymmetrically enters the chamber through an inlet located on one side of a central longitudinal drive shaft, and exits through an outlet located at the top of the housing. A spiraling parabolic deck forms a floor of the interior chamber, and spirals around the central longitudinal shaft from the bottom of the housing to the outlet at the top. A turbine mounted on the drive shaft within the outlet converts energy of the exiting wind to mechanical energy. An electrical generator converts the mechanical energy into electrical energy for recharging a battery or powering an electric motor.

11 Claims, 5 Drawing Sheets

U.S. PATENT DOCUMENTS

| | | |
|---|---|---|
| 5,664,418 A | 9/1997 | Walters |
| 5,760,515 A * | 6/1998 | Burns .................. 310/115 |
| 5,852,331 A | 12/1998 | Giorgini |
| 5,935,007 A | 8/1999 | Yang |
| 6,172,429 B1 | 1/2001 | Russell |
| 6,191,496 B1 | 2/2001 | Elder |
| 6,518,680 B2 | 2/2003 | McDavid, Jr. |
| 6,710,469 B2 | 3/2004 | McDavid, Jr. |
| 6,800,955 B2 | 10/2004 | McDavid, Jr. |
| 6,838,782 B2 * | 1/2005 | Vu .............................. 290/55 |
| 6,841,894 B2 * | 1/2005 | Gomez Gomar ............. 290/55 |
| 6,897,575 B1 * | 5/2005 | Yu .............................. 290/44 |

FOREIGN PATENT DOCUMENTS

WO     WO 93/19294     9/1993

* cited by examiner

VEHICLE-MOUNTED GENERATOR

BACKGROUND OF THE INVENTION

The present invention relates generally to electrical generation and energy conversion devices, and more particularly to a vehicle-mounted generator that converts the energy of wind or flowing water to mechanical or electrical energy.

The use of wind or flowing water to provide power for various uses dates back many centuries. In modern times, wind and water have been used to generate electricity. Hydroelectric generating plants have been used to generate large quantities of electrical energy for widespread distribution. However, this requires major permanent environmental changes to the areas where dams are built and reservoirs rise. Wind-powered devices, in general, have been used to perform mechanical work, or to generate electricity, only on a limited scale. With the ever-increasing demand for additional or alternative energy sources, all possible sources are being given more scrutiny. This is particularly true for sources that are non-polluting and inexhaustible. Free-flowing hydroelectric and wind-powered systems provide such sources, and the capturing of increased energy from wind and water has received much consideration.

With diminishing supplies of fossil fuels, and environmental concerns regarding their use, the manufacturers of motor vehicles have begun to look for alternative fuels and drive systems. A popular technology today is the use of so-called "hybrid" systems, which combine a gasoline-powered engine with an electric motor to obtain better gas mileage and reduce vehicle emissions. A bank of rechargeable batteries is utilized to power the electric motor, which assists the gasoline-powered engine when the vehicle accelerates or goes up a hill, for example. Energy from the gasoline-powered engine as well as the vehicle's brakes is utilized to recharge the batteries. Although hybrid drive systems provide some advantage over conventional gasoline-powered engines, there is still much to be done to improve their efficiency.

Other studies have been performed to determine the feasibility of powering a vehicle using solar power. To date, however, no practical design has been developed for utilizing this alternative power source due, primarily, to the very low efficiency of solar cells.

Existing wind-powered electrical generation devices commonly utilize a propeller mounted on the horizontal shaft of a generator, which in turn, is mounted at the top of a tower. This is an inefficient design because energy is extracted from the wind by reducing the wind velocity as it passes through the propeller. This creates a pocket of slow-moving air centered behind the propeller, which the ambient wind blows around. Therefore, only the outer portion of each propeller blade uses the wind efficiently.

To counter this effect, modern windmill designs utilize extremely long propeller blades. The use of such massive blades, however, has its own disadvantages. First, the propellers are known to kill or injure thousands of large birds each year. Second, the massive blades can be dangerous if the device fails structurally and the propeller breaks loose. In this case, the propeller can fly a considerable distance and cause serious damage or injury to anything or anyone in its path. Third, the propeller design contains an inherent gravitational imbalance. The rising blades on one side of the propeller's hub are opposing gravity, while the descending blades on the other side of the hub are falling with gravity. This imbalance creates a great deal of vibration and stress on the device. At great expense, consequently, the device must be structurally enhanced to withstand the vibration and stress, and thus avoid frequent maintenance and/or replacement.

All of these disadvantages of conventional windmill design also make conventional windmills unsuitable for mounting on a vehicle.

What is needed in the art is a generator that overcomes the disadvantages of existing systems and methods by providing an efficient source of electrical or mechanical energy suitable for use in improving the efficiency of motor vehicles. The present invention provides such a generator.

SUMMARY OF THE INVENTION

In one aspect, the present invention is a vehicle-mounted energy conversion device. A rigid cylindrical housing forms an enclosed interior chamber. The cylindrical housing includes an inlet located on one side of a central longitudinal drive shaft for asymmetrically inputting a moving fluid into the interior chamber, and an outlet located at a first end of the housing. A second end of the housing mounts to a vehicle. Within the housing, a spiraling parabolic deck forms a floor of the interior chamber. At the second end of the housing, the deck is aligned with the inlet. The deck spirals around the central longitudinal shaft from the second end of the housing to the outlet at the first end of the housing. A turbine is mounted on the drive shaft within the outlet for converting energy of the moving fluid to mechanical energy as the fluid passes through the turbine. The device may also include an electrical generator connected to the drive shaft for converting the mechanical energy produced by the turbine into electrical energy.

In another aspect, the present invention is a vehicle-mounted generator for improving fuel efficiency of a motor vehicle having a drive train comprising an internal combustion engine that drives a transmission connected to a drive shaft. The generator includes a rigid cylindrical housing forming an enclosed interior chamber. The housing includes an inlet located on one side of a central longitudinal drive shaft for asymmetrically inputting wind into the interior chamber, and an outlet located at a first end of the housing. The device also includes means for mounting a second end of the housing to the motor vehicle in a position such that relative wind, produced by the combination of ambient wind and motion of the vehicle, is directed into the inlet. A spiraling parabolic deck forms a floor of the interior chamber, and spirals around the central longitudinal shaft from the second end of the housing to the outlet at the first end of the housing. A turbine is mounted on the drive shaft within the outlet for converting wind energy to mechanical energy as the wind passes through the turbine. The device also includes an electrical generator connected to the drive shaft for converting the mechanical energy produced by the turbine into electrical energy, and means for supplying the electrical energy to recharge a battery that powers an electric motor connected to the transmission in parallel with the internal combustion engine.

In yet another aspect, the present invention is a system for improving fuel efficiency of a motor vehicle having a drive train comprising an internal combustion engine that drives a transmission connected to a drive shaft. The system includes an electric motor connected to the transmission in parallel with the internal combustion engine; a battery for powering the electric motor; and a vehicle-mounted generator for converting wind energy into electrical energy for recharging the battery.

In still yet another aspect, the present invention is directed to a system for extending battery life in a motor vehicle powered by an electric motor. The system includes a rechargeable battery for powering the electric motor; a vehicle-mounted generator for converting wind energy into electrical energy; and means for supplying the electrical energy to recharge the battery.

BRIEF DESCRIPTION OF THE DRAWINGS

The invention will be better understood and its numerous objects and advantages will become more apparent to those skilled in the art by reference to the following drawings, in conjunction with the accompanying specification, in which.

In the drawings, like or similar elements are designated with identical reference numerals throughout the several views thereof, and the various elements depicted are not necessarily drawn to scale.

DETAILED DESCRIPTION OF EMBODIMENTS

The present invention is a high-efficiency generator that mounts on a moving vehicle and, in one embodiment, generates mechanical or electrical energy from the relative wind created by the combination of the ambient wind and the motion of the vehicle. In another embodiment, the present invention mounts on a water-borne vehicle and generates mechanical or electrical energy from the flow of the water created by the motion of the vehicle. The terminology utilized herein generally addresses the wind-powered embodiment, although the description is also applicable to the water-powered embodiment. In either embodiment, the energy generated by the invention may then be utilized to directly perform work, to power an electric motor, or to recharge one or more batteries.

Figure 1:
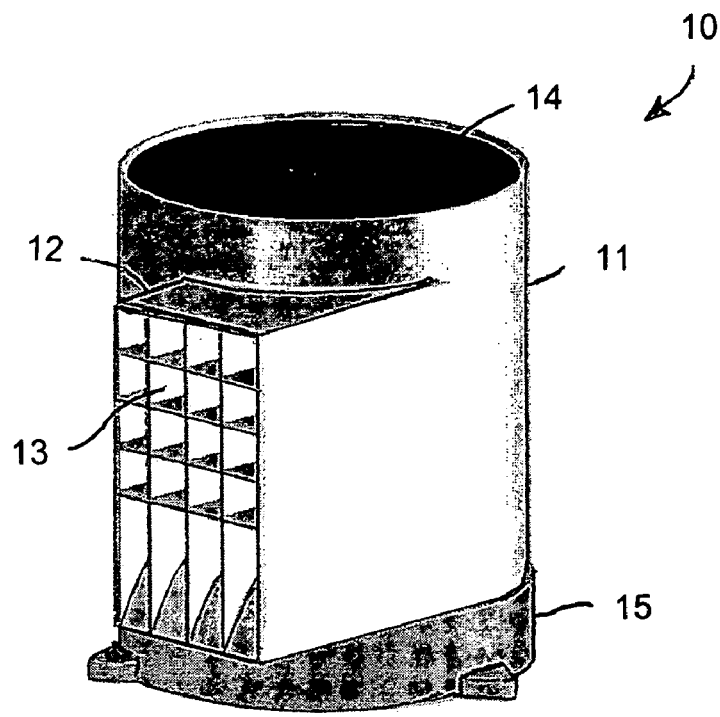
FIG. 1 is a perspective view of the generator illustrating a housing in one embodiment of the present invention.

FIG. 1 is a perspective view of the generator 10 illustrating a housing 11 in one embodiment of the present invention. The housing is generally cylindrical, and mounts at its base to a vehicle. An air inlet 12 is attached to one side of the cylinder. A front grill provides a number of openings 13 in the inlet to guide the incoming air to one side of a central longitudinal shaft shown below in FIG. 3. An outlet opening in the top of the cylinder houses a wind-driven turbine 14. Both the inlet and the outlet may be covered by screens to protect the turbine from bugs and debris. The screens may have heating wires running through them to defrost the screens in case of snow or freezing rain. A base portion 15 of the cylinder houses a generator and, preferably, a flywheel (see FIG. 3). The housing 11 may be constructed of any suitable rigid material such as wood, plastic, metal, and the like. In the preferred embodiment of the present invention, the housing is constructed of a high-grade, ultraviolet-protected plastic.

Figure 2:
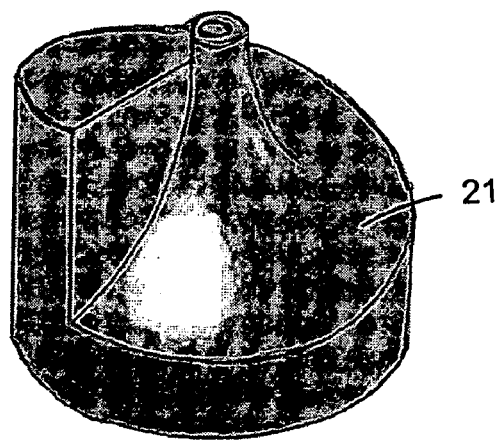
FIG. 2 is a perspective view of a sloping parabolic floor (deck) of an interior chamber formed by the housing of FIG. 1.

FIG. 2 is a perspective view of a sloping parabolic floor (deck) 21 of an interior chamber formed by the housing 11 of FIG. 1. The floor spirals upward causing air that enters through the inlet 12 to spiral upward, creating a vortex that drives the turbine 14.

Figure 3:
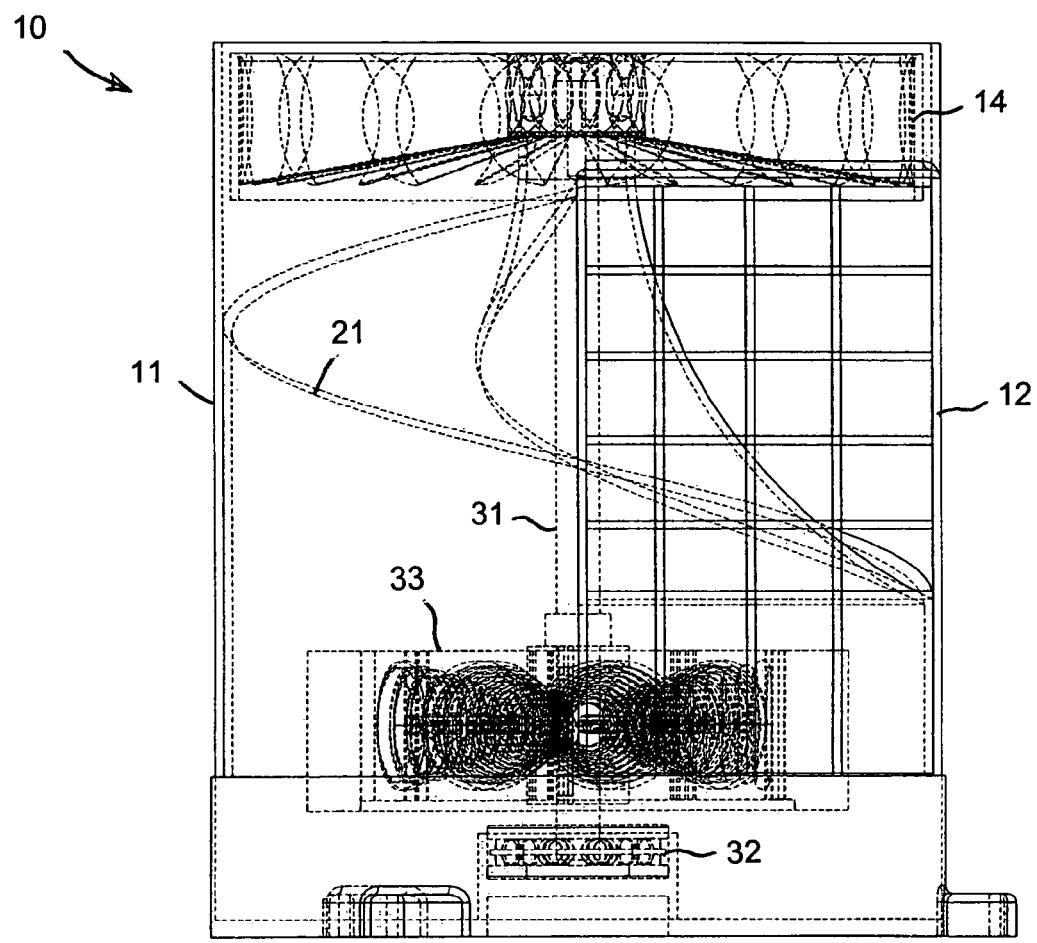
FIG. 3 is a front view of the generator of the present invention with interior components drawn in phantom.

FIG. 3 is a front view of the present invention 10 with interior components drawn in phantom. The parabolic deck 21 of the interior chamber rises toward the turbine 14 causing air that enters through the inlet 12 to rotate and form the drive vortex. The turbine is mounted on a central longitudinal shaft 31, which drives an electrical generator 32 to produce electrical energy. A large flywheel 33 is mounted on the shaft and serves to maintain rotation of the shaft when the vehicle slows or comes to a stop. In the preferred embodiment, the flywheel is a fluid flywheel described in more detail in conjunction with FIG. 6 below. In another embodiment, the flywheel may be a permanent magnet, surrounded by copper windings. The flywheel may serve both as an internal energy storage device due to its angular momentum, and as a dynamo for the generator 32. A solid-state electronic regulator (not shown) may be utilized to control the electrical current load. The regulator maintains a zero load until a preset rotational velocity (RPM) is reached. The load is then increased in order to generate electricity while maintaining the RPM of the turbine at a preselected level.

Figure 4:
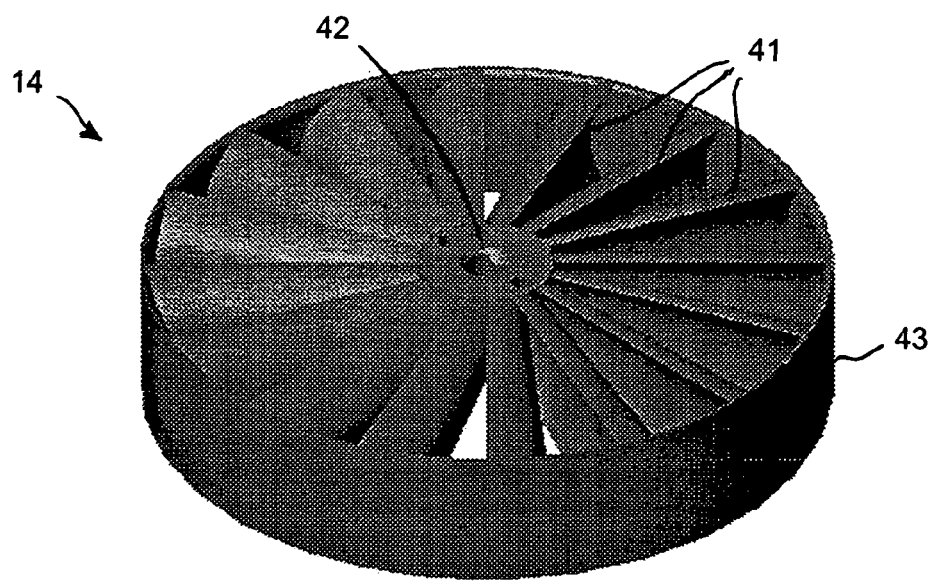
FIG. 4 is a perspective view of the turbine.

FIG. 4 is a perspective view of the turbine 14. A plurality of radially spaced turbine blades 41 are mounted to a central hub 42 and an outer rim 43. Each turbine blade has a crescent-shaped cross-section, and is mounted so that the angle of attack of the air in the rising vortex causes the blade to create a lift vector in the direction of rotation of the turbine.

Figure 5:
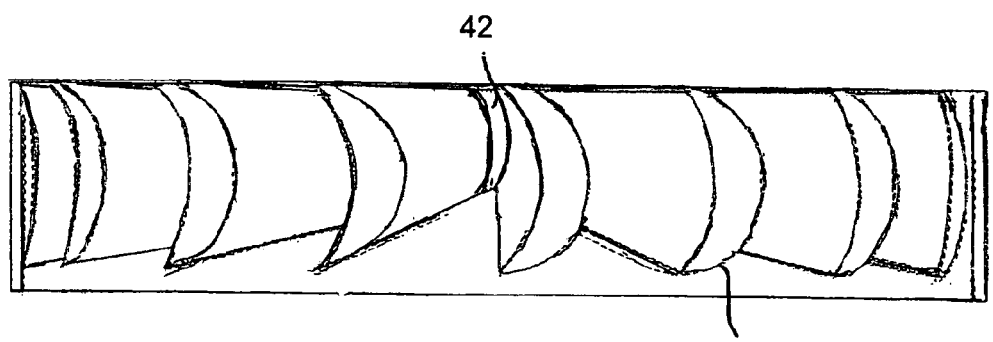
FIG. 5 is a side view of the turbine.

FIG. 5 is a side view of the turbine 14. This view illustrates that the height of each blade 41 increases linearly as the distance from the central hub 42 increases.

Figure 6:
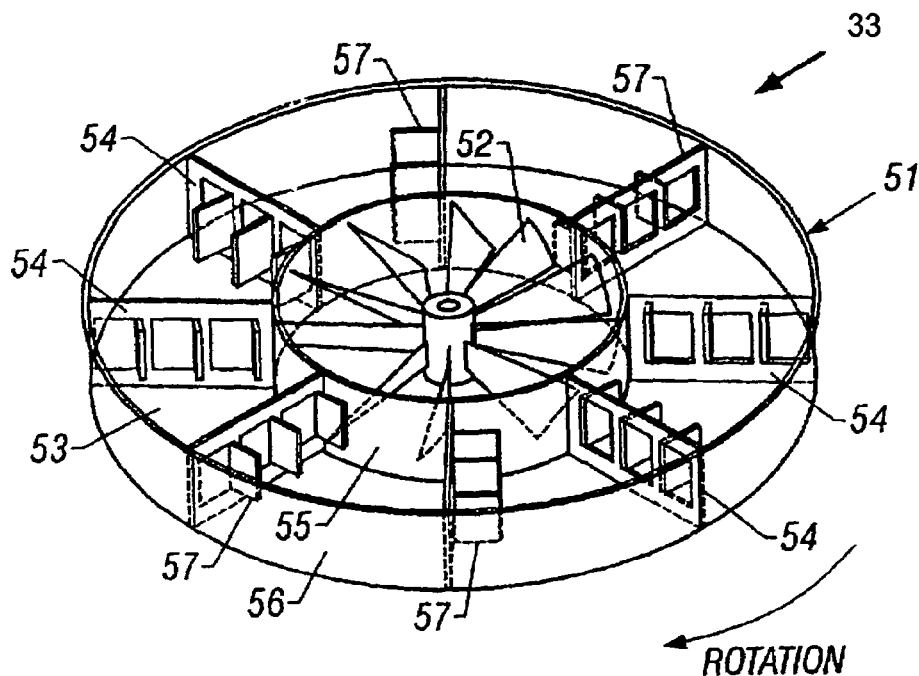
FIG. 6 is a perspective view of an embodiment of the flywheel.

FIG. 6 is a perspective view of the preferred embodiment of the flywheel 33. In this embodiment, the flywheel (shown in phantom) includes a hollow disk-shaped shell 51 that is filled with a fluid such as water. The design shown also includes a cooling fan 52 in the hub of the flywheel that rotates with the drive shaft 23 and the flywheel to produce a flow of cooling air that is used to cool the adjacent generator 33. The placement of the fan in the hub of the flywheel creates an annular chamber 53 that holds the fluid. Within the chamber, a plurality of radial bulkheads 54 extend from the interior wall 55 to the exterior wall 56 of the chamber. Each of the radial bulkheads includes hinged gates or hatches 57. In the exemplary embodiment illustrated, each radial bulkhead includes three hinged gates.

During acceleration of the flywheel 33, the gates 57 open in the opposite direction of rotation. This allows the fluid to partially flow through the radial bulkheads 54, reducing start-up inertia. The fluid then slowly comes up to speed due to friction with the interior and exterior walls 55 and 56 of the annular chamber, and due to the motion of the radial bulkheads through the fluid. During deceleration of the flywheel, the gates close because of the forward momentum of the fluid. This creates solid radial bulkheads and causes the flywheel to perform as a solid flywheel. The angular momentum of the flywheel then helps to maintain the angular velocity of the drive shaft 31 when the input power of the wind drops off.

Thus, the fluid-filled flywheel 33 is particularly well suited for use with the generator of the present invention. The fluid-filled flywheel allows rapid spin-up of the drive shaft 31 by reducing the start-up inertia, but resists deceleration like a solid flywheel. These features can significantly boost the efficiency of a wind-powered or water-powered device that operates with varying input power levels. By simply inverting the flywheel, the fluid-filled flywheel can be used with systems that spin either clockwise or counterclockwise. As an additional feature, shipping weight is greatly reduced because the fluid can be added at the point of use.

In the preferred embodiment of the present invention, the turbine 14 and flywheel 33 may be made of metal. Further, all metal parts may be coated with, for example, plastic, chrome, or paint to prevent corrosion. As discussed above, the flywheel may be a permanent magnet or may be a fluid-filled flywheel. All bearings may be magnetic-repulsion-levitation bearings so that there is no physical contact between the moving and stationary elements of the device. The base of the housing 11 may mount upon a support plate or bracket, or may mount directly on the vehicle.

The housing 11 may vary in its dimensions, depending upon the specific application for which the generator is utilized. The housing for an air-driven vehicle-mounted generator (for example, for a small passenger car), designed for high-wind conditions, may be about 10 inches wide, 10 inches high, and 12–15 inches from front to back. The generator 32 and flywheel 33, if any, may be mounted inside the contour of the vehicle, or on a luggage rack. Models for SUV's, pickup trucks, buses, semi-tractor trucks, and military vehicles may be scaled up to serve their greater power demands. A small hydroelectric version of the invention that is mounted on the hull of a boat or ship may have similar dimensions to the air-driven version. However, the ratio of the height of the device to the diameter of the housing may vary. For example, the hydroelectric embodiment of the invention may have a height that is shorter when compared to its diameter, and may have a height that is equal to or less than its diameter. The hydroelectric version may also be inverted so that the force of gravity assists the flow of the water vortex.

It should be noted that when the present invention is oriented vertically, the turbine 14, the generator 32, and the flywheel 33 rotate around a vertical axis. Therefore, the supporting structures are not subject to the vibration and stress produced by gravity effects in prior art devices in which propellers rotate around a horizontal axis. Moreover, exceptional wind-conversion efficiency is realized from the present invention as it diverts and accelerates the relative wind flow into a vortex that has several times the velocity of the incoming wind flow by the time it reaches the turbine. As a result, the present invention provides a new and improved generator that is quieter, safer, more efficient, and more cost effective than existing devices.

Figure 7:
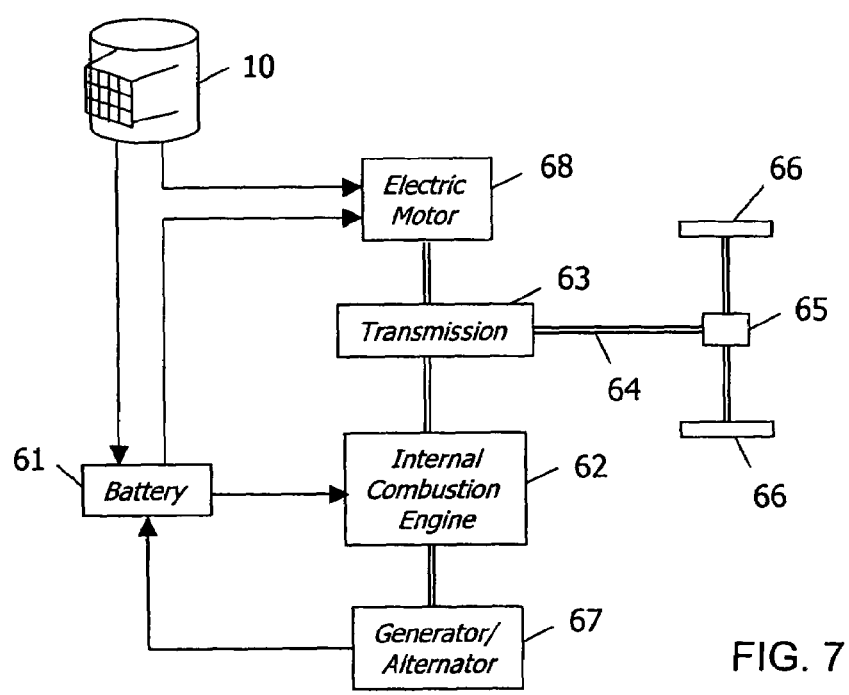
FIG. 7 is a simplified block diagram of an embodiment of the system of the present invention.

FIG. 7 is a simplified block diagram of an embodiment of the system of the present invention. In the illustrated embodiment, the generator 10 of the present invention is utilized to improve the efficiency of a hybrid drive system (for example, a gasoline/electric hybrid) in a motor vehicle. In a conventional drive system, a battery 61 is used to start an internal combustion engine 62. The internal combustion engine drives a transmission 63, which turns a drive shaft 64. The drive shaft may connect through a differential 65 to power the wheels 66. The internal combustion engine also drives a generator/alternator 67, which powers accessories in the vehicle and recharges the battery 61 while the engine is running. When the engine is not running, the battery powers the accessories.

In a gasoline/electric hybrid drive system, the battery (or more commonly a bank of batteries) also powers an electric motor 68 connected to the transmission 63 in parallel with the internal combustion engine 62. The electric motor may assist the internal combustion engine when the vehicle is accelerating or going up a hill, for example. In addition, the internal combustion engine may shut off when the vehicle coasts or comes to a stop. The battery powers the vehicle accessories whenever the internal combustion engine shuts off.

This process places a large load on the battery 61, which must be recharged by the generator/alternator 67 whenever the internal combustion engine 62 is running. In addition, some hybrid systems generate additional recharging energy from generators associated with the brakes. Still, the fuel efficiency of the internal combustion engine is not as good as it could be because a considerable amount of energy generated by the engine is used to recharge the battery rather than move the vehicle.

In the present invention, the wind generator 10 supplies some or all of the electrical energy needed for recharging the battery 61. This significantly reduces the load on the internal combustion engine 62, thereby increasing its fuel efficiency. If the battery is fully charged, the wind generator may supply electrical energy directly to the electric motor 68, thereby maintaining the battery charge while enabling the electric motor to supplement and/or replace the internal combustion engine for certain periods of time.

In another embodiment, the present invention is implemented in a purely electric vehicle. Still referring to FIG. 7, the configuration is similar, with the internal combustion engine 62 and the generator/alternator 67 removed. The rechargeable battery 61 powers the electric motor 68, which drives the transmission 63 or other type of drive train. In conventional electric vehicles, the battery is recharged when the vehicle is parked at a recharging station. The range and payload of the vehicle are then dependent on the charge of the battery, and when the battery is depleted, the vehicle stops operating.

The wind generator 10 of the present invention extends the range and payload of the electric vehicle by converting the relative wind to electrical energy for recharging the battery 61 during operation of the vehicle.

Figure 8:
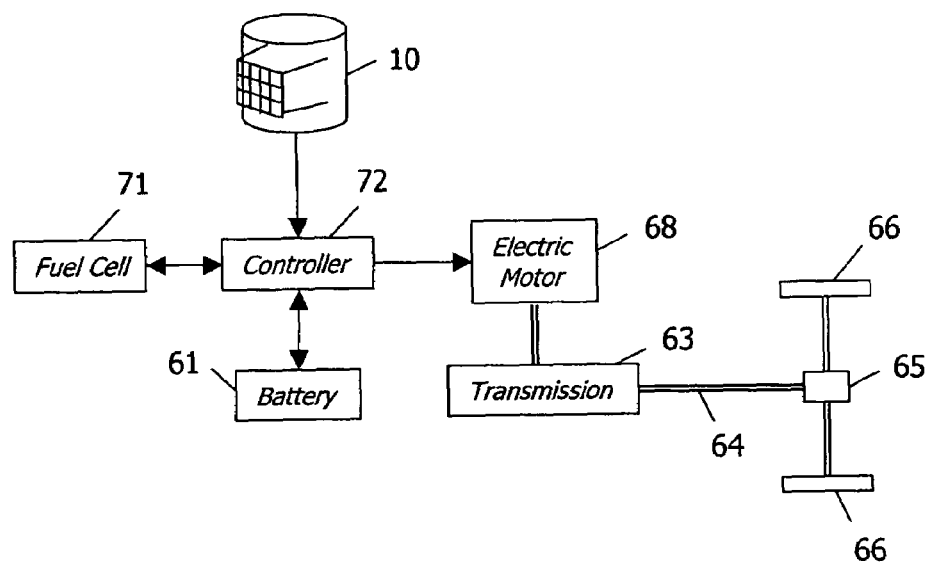
FIG. 8 is a simplified block diagram of a second embodiment of the system of the present invention.

FIG. 8 is a simplified block diagram of a second embodiment of the system of the present invention. It should also be recognized that the present invention may be utilized to increase the efficiency of vehicles powered by any type of fuel-consuming engine. For example, in a fuel-cell vehicle, a fuel cell 71 converts hydrogen to electrical energy, and the electrical energy is then used to recharge one or more batteries 61 and/or to drive one or more electric motors 68 for moving the vehicle. The wind generator 10 of the present invention provides additional electrical energy, thus reducing the amount of electrical energy that must be produced by the fuel cell, and consequently reducing the amount of hydrogen that must be consumed. With the present invention, the vehicle may include a controller 72 that provides a consistent level of electrical energy to the electric motor 68. Thus, when the vehicle-mounted generator produces electrical energy, the controller causes the fuel cell 71 to reduce its output of electrical energy by an amount equivalent to the electrical energy produced by the vehicle-mounted generator.

Figure 9:
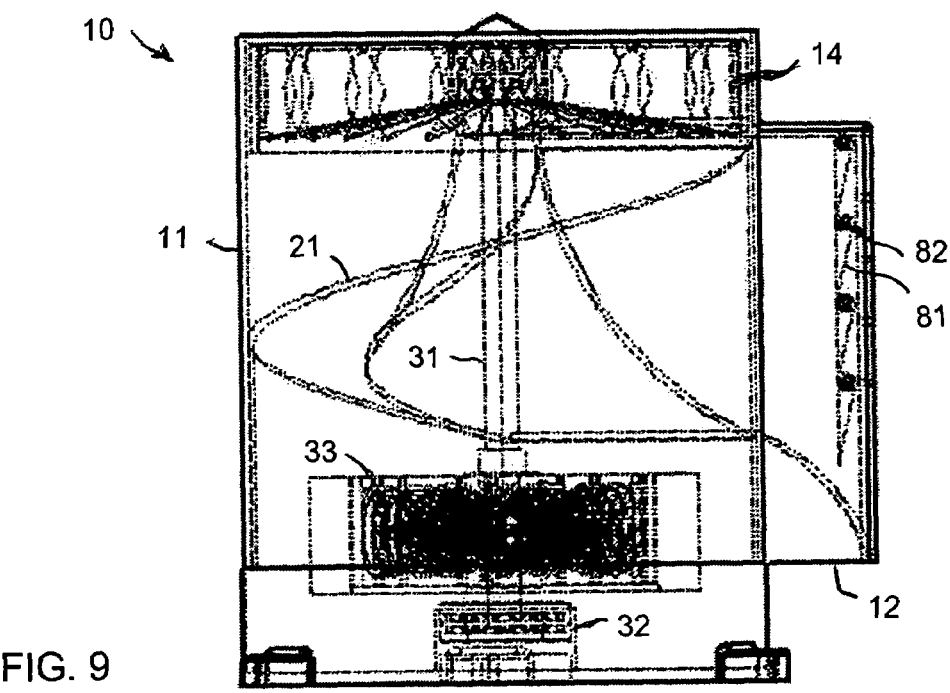
FIG. 9 is a side view of the generator of the present invention with interior components drawn in phantom.

FIG. 9 is a side view of the generator of the present invention with interior components drawn in phantom. In the embodiment shown in FIG. 8, a number of horizontal, one-way louvers 81 are mounted behind the front grill of the inlet 12. The louvers are rotatably mounted on hinges 82, which permit the louvers to rise in an inward direction due to the inward flow of air through the inlet. In some cases, when there is a rapid acceleration of the entering air, back pressure from the turbine 14 may create a situation in which air in the interior chamber tries to flow backward out of the inlet. Such a backflow causes the louvers to immediately close, thereby preventing the backflow from escaping through the inlet.

It is to be understood that even though numerous characteristics and advantages of the present invention have been set forth in the foregoing description, the disclosure is illustrative only, and changes may be made in detail, especially in matters of size, shape, and arrangement of parts within the principles of the invention to the full extent indicated by the broad general meaning of the terms in which the appended claims are expressed.

What is claimed is:

1. A vehicle-mounted energy conversion device, comprising:
    a rigid cylindrical housing forming an enclosed interior chamber, said housing having an inlet located on one side of a central longitudinal drive shaft for asymmetrically inputting a moving fluid into the interior chamber, and having an outlet located at a first end of the housing;
    means for mounting a second end of the housing to a vehicle;
    a spiraling parabolic deck forming a floor of the interior chamber, said deck spiraling around the central longitudinal shaft from the second end of the housing to the outlet at the first end of the housing, wherein at the second end of the housing, the deck is aligned with the inlet; and
    a turbine mounted on the drive shaft within the outlet for converting energy of the moving fluid to mechanical energy as the fluid passes through the turbine.

2. The device according to claim 1, further comprising an electrical generator connected to the drive shaft for converting the mechanical energy produced by the turbine into electrical energy.

3. The device according to claim 2, wherein the moving fluid is air, and the device is adapted to convert wind energy into electrical energy.

4. The device according to claim 3, wherein the mounting means includes means for mounting the second end of the housing to the vehicle in a position such that relative wind is directed into the inlet, said relative wind being produced by the combination of ambient wind and motion of the vehicle.

5. The device according to claim 2, wherein the moving fluid is water, and the device is adapted to convert the energy of moving water into electrical energy.

6. The device according to claim 2, further comprising a flywheel connected to the drive shaft for maintaining rotation of the shaft during periods of time when the volume of moving fluid entering the device is reduced.

7. The device according to claim 6, wherein the flywheel is a fluid-filled flywheel that rotates with the drive shaft in a direction of rotation, said fluid-filled flywheel comprising:
    a hollow disk-shaped shell filled with fluid; and
    a plurality of radial bulkheads that separate the interior of the shell into separate sections, each of the bulkheads having at least one gate pivotally mounted thereon to open in a direction opposite to the direction of rotation, said gate covering an aperture in the bulkhead when the gate is pivoted to a closed position, and said gate opening the aperture when the gate is pivoted to an open position;
    whereby the gates are opened by the fluid when the flywheel accelerates in the direction of rotation, thus allowing the fluid to flow through the apertures in the bulkheads and reduce start-up inertia of the flywheel, and whereby the gates are closed by the fluid when the flywheel decelerates, thus preventing the fluid from flowing through the apertures, and causing the flywheel to maintain angular momentum like a solid flywheel.

8. The device according to claim 1, further comprising a plurality of louvers mounted inside the inlet, said louvers being adapted to allow the moving fluid to enter the interior chamber through the inlet, while preventing the moving fluid from exiting through the inlet.

9. A vehicle-mounted generator for improving fuel efficiency of a motor vehicle having a drive train comprising an internal combustion engine that drives a transmission connected to a drive shaft, said generator comprising:
    a rigid cylindrical housing forming an enclosed interior chamber, said housing having an inlet located on one side of a central longitudinal drive shaft for asymmetrically inputting wind into the interior chamber, and having an outlet located at a first end of the housing;
    means for mounting a second end of the housing to the motor vehicle in a position such that relative wind is directed into the inlet, said relative wind being produced by the combination of ambient wind and motion of the vehicle;
    a spiraling parabolic deck forming a floor of the interior chamber, said deck spiraling around the central longitudinal shaft from the second end of the housing to the outlet at the first end of the housing, wherein at the second end of the housing, the deck is aligned with the inlet;
    a turbine mounted on the drive shaft within the outlet for converting wind energy to mechanical energy as the wind passes through the turbine;
    an electrical generator connected to the drive shaft for converting the mechanical energy produced by the turbine into electrical energy; and
    means for supplying the electrical energy to recharge a battery that powers an electric motor connected to the transmission in parallel with the internal combustion engine.

10. The generator of claim 9, further comprising a flywheel connected to the drive shaft for maintaining rotation of the shaft during periods of time when the wind entering the device is reduced.

11. The generator of claim 9, further comprising a plurality of louvers mounted inside the inlet, said louvers being adapted to allow the wind to enter the interior chamber through the inlet, while preventing the wind from exiting through the inlet.

* * * * *